US012554926B2

(12) United States Patent
Lu et al.

(10) Patent No.: US 12,554,926 B2
(45) Date of Patent: Feb. 17, 2026

(54) METHOD, DEVICE, COMPUTER EQUIPMENT AND STORAGE MEDIUM FOR DETERMINING TEXT BLOCKS OF PDF FILE

(71) Applicant: KDAN MOBILE SOFTWARE LTD., Tainan (TW)

(72) Inventors: Sheng-Jun Lu, Tainan (TW); Zhi-Peng Luo, Tainan (TW); Shuai Wang, Tainan (TW); Po-Chou Su, Tainan (TW); Wen-Wei Lin, Tainan (TW)

(73) Assignee: KDAN MOBILE SOFTWARE LTD., Tainan (TW)

( * ) Notice: Subject to any disclaimer, the term of this patent is extended or adjusted under 35 U.S.C. 154(b) by 271 days.

(21) Appl. No.: 18/526,170

(22) Filed: Dec. 1, 2023

(65) Prior Publication Data

US 2024/0303432 A1 Sep. 12, 2024

(30) Foreign Application Priority Data

Mar. 7, 2023 (CN) .......................... 202310212772.0

(51) Int. Cl.
*G06F 40/205* (2020.01)

(52) U.S. Cl.
CPC .................................. *G06F 40/205* (2020.01)

(58) Field of Classification Search
CPC .. G06F 40/205; G06V 30/412; G06V 30/148; G06V 30/418
See application file for complete search history.

(56) References Cited

U.S. PATENT DOCUMENTS

| 11,030,387 B1* | 6/2021 | Juhl | G06F 40/131 |
|---|---|---|---|
| 2008/0141117 A1* | 6/2008 | King | G06F 16/93 |
| | | | 714/48 |
| 2020/0005033 A1* | 1/2020 | Bellert | G06F 16/93 |
| 2020/0042785 A1* | 2/2020 | Burdick | G06V 30/416 |
| 2021/0357633 A1* | 11/2021 | Bade | G06F 40/284 |
| 2022/0156448 A1* | 5/2022 | Juhl | G06F 40/30 |
| 2022/0284175 A1* | 9/2022 | Schwiebert | G06V 30/414 |
| 2022/0414389 A1* | 12/2022 | Shrotriya | G06F 16/35 |

FOREIGN PATENT DOCUMENTS

CN 112733513 A 4/2021

* cited by examiner

*Primary Examiner* — Anne L Thomas-Homescu
(74) *Attorney, Agent, or Firm* — WPAT, PC

(57) ABSTRACT

There is provided a method for determining text blocks of a PDF text, including: acquiring information of characters of the PDF text; performing an initial division according to gap outliers of the PDF text in a transverse direction and a longitudinal direction, and adding block tags of first text blocks to the information of characters; sequentially processing inaccurate lines and inaccurate words in each first text block according to baselines of characters, character lengths, character spaces and character indexes; performing a baseline arrangement on lines of the PDF text; sequentially comparing two lines to form second text blocks; and sequentially comparing two second text blocks to identify whether to perform a secondary merging and a secondary division.

16 Claims, 8 Drawing Sheets

FIG. 3A character sequence in PDF bank:

① ② ① ②
晨起，打 感觉呢称有点 开 简 书 ，收到 意思，便点进
1 2 3 4 5 6 7 8 9 10 11 12 13 14 ··· reset lines:

① ②
晨起，打开 简书 ，收到 感觉呢称有点意思，便点进
1 2 3 4 11 12 13 14 ···
        Tag_b reset character sequence:

晨起，打开 简书 ，收到感觉呢称有点意思，便点进
1 2 3 4 5 6 7 8 ···
                Tag_b

METHOD, DEVICE, COMPUTER EQUIPMENT AND STORAGE MEDIUM FOR DETERMINING TEXT BLOCKS OF PDF FILE

CROSS-REFERENCE TO RELATED APPLICATIONS

This application claims the priority benefit of Chinese Patent Application Serial Number 202310212772.0, filed on Mar. 7, 2023, the full disclosure of which is incorporated herein by reference.

FIELD OF THE DISCLOSURE

This disclosure generally relates to the file processing and, more particularly, to a method, a device, a computer equipment and a storage medium that divide each text page of a PDF file into multiple text blocks and transform said each text page to a target file having identical segmentations.

BACKGROUND OF THE DISCLOSURE

The PDF (portable document format) files and the Office Software are popular electronic files. Although a PDF file can be read almost on any operating system, contents of the PDF file only contains information of characters. That is, if it is desired to edit a PDF file, the PDF file firstly needs to be transformed into a document having another format. However, because the information of characters of a PDF file does not directly contain information of section breaks and column breaks, it is necessary to further parse the information of characters if corresponding section breaks and column breaks are required in the transformed document.

SUMMARY

Accordingly, the present disclosure provides a method, a device, a computer equipment and a storage medium that divide text blocks of a PDF text by parsing information of characters of the PDF text, and transform the PDF text to another target document having identical segmentations of text blocks.

The present disclosure provides a method, a device, a computer equipment and a storage medium that perform an initial division according to gap outliers of information of characters in a PDF text, and then sequentially remove error characters, inaccurate lines and inaccurate words in the initial division to improve the segmentation accuracy, and finally sequentially compare two text blocks to confirm whether a secondary merging and/or a secondary division is required to realize an accurate segmentation of the PDF text.

The present disclosure provides a method for determining text blocks of a PDF text, including the steps of: acquiring information of characters of the PDF text; performing an initial division according to gap outliers of the PDF text in a transverse direction and a longitudinal direction, and adding block tags of first text blocks to the information of characters; sequentially processing inaccurate lines and inaccurate words in each first text block according to baselines of characters, character lengths, character spaces and character indexes; performing a baseline arrangement on lines of the PDF text; sequentially comparing two lines after the baseline arrangement to form second text blocks; and sequentially comparing two second text blocks to identify whether to perform a secondary merging and a secondary division.

The present disclosure further provides a device for determining text blocks of a PDF text. The device includes a non-volatile storage medium, a memory and a processor. The non-volatile storage medium is configured to record a computer program. The memory is configured to provide an environment for operations of the computer program in the non-volatile storage medium. The processor is configured to run the computer program to obtain information of characters of the PDF text to be stored in the memory, perform an initial division according to gap outliers of the PDF text in a transverse direction and a longitudinal direction, and to add block tags of first text blocks to the information of characters in the memory, sequentially process inaccurate lines and inaccurate words in each first text block according to baselines of characters, character lengths, character spaces and character indexes, and update the character indexes of the information of characters in the memory, perform a baseline arrangement on lines of the PDF text, sequentially compare two lines after the baseline arrangement to form second text blocks, and sequentially compare two second text blocks to identify whether to perform a secondary merging and a secondary division.

The present disclosure further provides a computer equipment including a storage device and a processor. The storage device is used to record a computer program. The processor is used to run the computer program recorded in the storage device to execute a method for determining text blocks of a PDF text according to the embodiments of the present disclosure.

The present disclosure further provides a content accessible memory recorded with a computer program. The computer program is run by a processor to implement a method for determining text blocks of a PDF text according to the embodiments of the present disclosure.

In the present disclosure, the PDF text is referred to, for example, one text page of a PDF file. The method, the device, the computer equipment and the storage medium of the present disclosure is to perform segmentation of every text page of a PDF file. The segmentation may process/transform a single text page of the PDF file at a time or process/transform all text pages of the PDF file at a time without particular limitations.

BRIEF DESCRIPTION OF DRAWINGS

Other objects, advantages, and novel features of the present disclosure will become more apparent from the following detailed description when taken in conjunction with the accompanying drawings.

FIGS. 3A and 3B are schematic diagrams of the Steps S202 to S2023 in FIG. 2. FIGS. 3A and 3B contain foreign characters to illustrate the instant invention; and these foreign characters form no part of the instant invention.

FIG. 5 is a schematic diagram of the Step S207 in FIG. 2. FIG. 5 contains foreign characters to illustrate the instant invention; and these foreign characters form no part of the instant invention.

FIGS. 6A and 6B contain foreign characters to illustrate the instant invention; and these foreign characters form no part of the instant invention.

FIG. 7 contains foreign characters to illustrate the instant invention; and these foreign characters form no part of the instant invention.

FIG. 8 is a schematic diagram of the final segmentation of text blocks obtained by a method for determining text blocks of a PDF text according to one embodiment of the present disclosure. FIG. 8 contains foreign characters to illustrate the instant invention; and these foreign characters form no part of the instant invention.

DETAILED DESCRIPTION OF THE DISCLOSURE

It should be noted that, wherever possible, the same reference numbers will be used throughout the drawings to refer to the same or like parts.

One objective of the present disclosure is to provide a method for processing (e.g., including recognizing and segmenting) text blocks in a portable document format (PDF) file, and a device, a computer equipment and a content accessible memory using the method. The present disclosure further transforms the processed PDF file to a target document that shows identical segmentations.

Figure 1:
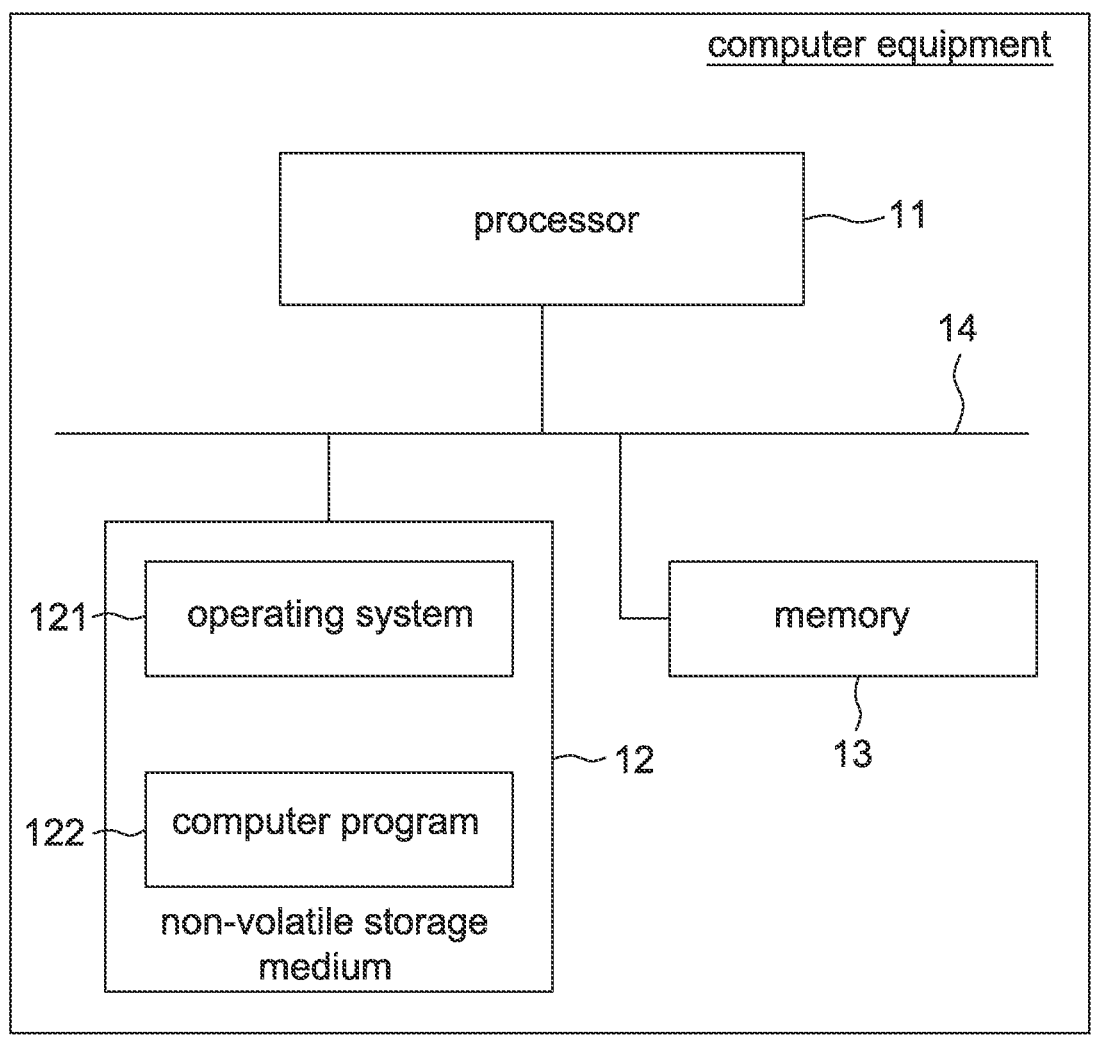
FIG. 1 is a schematic block diagram of a computer equipment according to one embodiment of the present disclosure.

Please refer to FIG. 1, it is a schematic block diagram of a computer equipment 100 according to one embodiment of the present disclosure. The computer equipment 100 is equipment capable of reading a PDF file and/or transforming a PDF file to another target document, such as a desktop computer, a tablet computer or a notebook computer without particular limitations.

The computer equipment 100 includes a processor 11 and a storage device connected via a bus 14. The storage device includes a non-volatile storage medium 12 and a memory 13. The non-volatile storage medium 12 records an operating system (OS) 121 and a computer program 122 therein. The computer program 122 includes program(s) for running methods for determining text blocks of a PDF text in the embodiments of the present disclosure.

The processor 11 includes, for example, a central processing unit (CPU) and/or a micro processing unit (MCU) that provides calculation and control ability to support operations of the computer equipment 100. Methods that the processor 11 runs the operating system 121 and the computer program 122, and accesses the memory 13 via the bus 14 are known to the art and not main objectives of the present disclosure, and thus details thereof are not described herein.

The memory 13 provides an environment for operations of the computer program 122 in the non-volatile storage medium 12, e.g., recording contents of text objects (e.g., including baselines, heights, widths, ascenders, descenders, line gaps, leadings, fonts, coordinates, colors of characters, but not limited to) obtained in parsing a PDF file. And the contents of text objects are for being accessed by the processor 11 according to the computer program 122.

It is appreciated that other information may be obtained by parsing a PDF file, e.g., including path objects and graphic objects. The present disclosure is to perform the segmentation and transformation mainly using the text objects.

Figure 2:
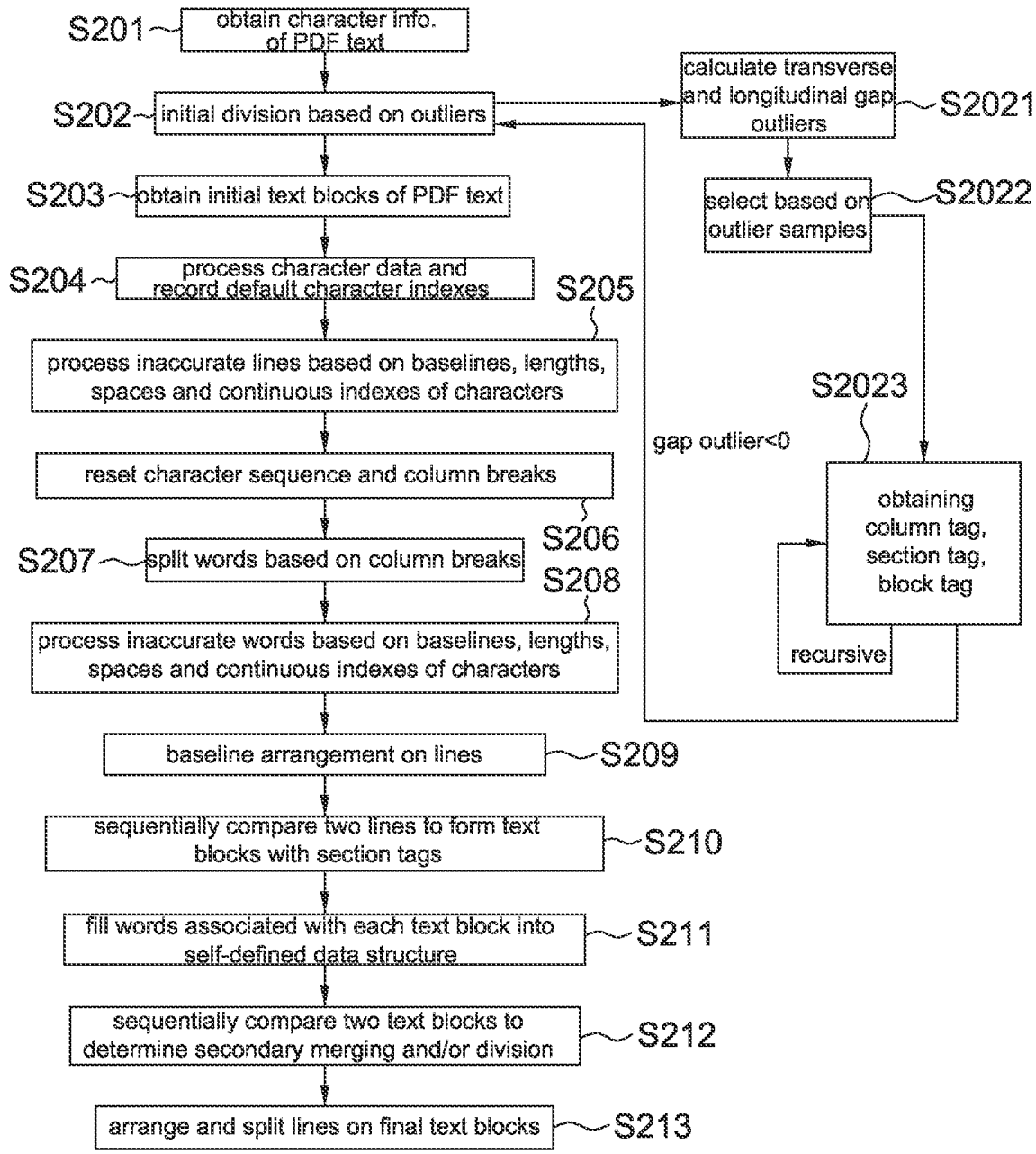
FIG. 2 is a flow chart of a method for determining text blocks of a PDF file according to one embodiment of the present disclosure.

Please refer to FIG. 2, it is a flow chart of a method for determining text blocks of a PDF text run by the computer equipment 100 according to one embodiment of the present disclosure. The method includes the steps of: obtaining information of characters of a PDF text (Step S201); performing an initial division according to gap outliers (Step S202); obtaining initial text blocks (Step 203); processing character data and recording default character indexes (Step S204); processing inaccurate lines according to baselines of characters, character lengths, character spaces and continuous character indexes (Step S205); resetting a showing sequence and column breaks of characters (Step S206); splitting words according to column breaks (Step S207); processing inaccurate words according to the baselines of characters, the character lengths, the character spaces and the continuous character indexes (Step S208); performing a baseline arrangement on lines (Step S209); sequentially comparing two lines to form text blocks and marking section tags (Step S210); filling words associated the text blocks in a self-defined data structure (Step S211); sequentially comparing two text blocks to identify whether to perform a secondary merging and/or a secondary division (Step S212); and performing an arrangement and splitting lines on final text blocks (Step S213).

The method for determining text blocks of a PDF text of the present disclosure is illustrated hereinafter by an example.

Step S201: The processor 11 runs the computer program 122 to parse a PDF text (e.g., one page of a PDF file) to obtain information of characters of the PDF text, and the information of characters is recorded in the memory 13. In this aspect, the PDF file is a file specified by a user to be processed.

The parsing of a PDF file in the present disclosure is to record, e.g., using a user defined source language, contents of the PDF file, e.g., including text objects, in the memory 13 to be accessed by the computer program 122 for the following (e.g., after the Step S201) calculation. The information of characters includes those obtained from the PDF bank such as, for example, baselines, heights, widths, ascenders, descenders, line gaps, leadings, fonts, coordinates and colors of characters.

Step S202: Next, the computer program 122 performs an initial division according to transverse gap outliers and longitudinal gap outliers. For example, when one gap between words is much larger than other gaps, a column break (i.e. longitudinal segmentation) or a section break (i.e. transverse segmentation) is performed. In one aspect, the Step S202 includes: calculating transverse gap outliers and longitudinal gap outliers (Step S2021); making choices according to samples of the gap outliers (Step S2022); and obtaining column tags, section tags and block tags (Step S2023).

Step S2021: The gap outliers herein are referred to those larger than other gaps, and are considered a division may be performed at these gaps. In one aspect, outliers obtained using the Q-value test of the static calculations are used as the gap outliers herein, but the present disclosure is not limited to. The computer program 122 may be arranged to obtain the gap outliers using other static calculations.

Step S2022: In one aspect, the gap outlier larger than an average of gap outliers of the PDF text is kept and the gap outlier smaller than the average of gap outliers of the PDF text is abandoned. The kept gap outliers are used to perform the division. However, keeping and abandoning the gap outliers of the present disclosure are not limited to use the average of gap outliers as a comparison reference. It is possible to select a predetermined value lager than or smaller than the average of gap outliers as the comparison reference without particular limitations.

Figure 3A:
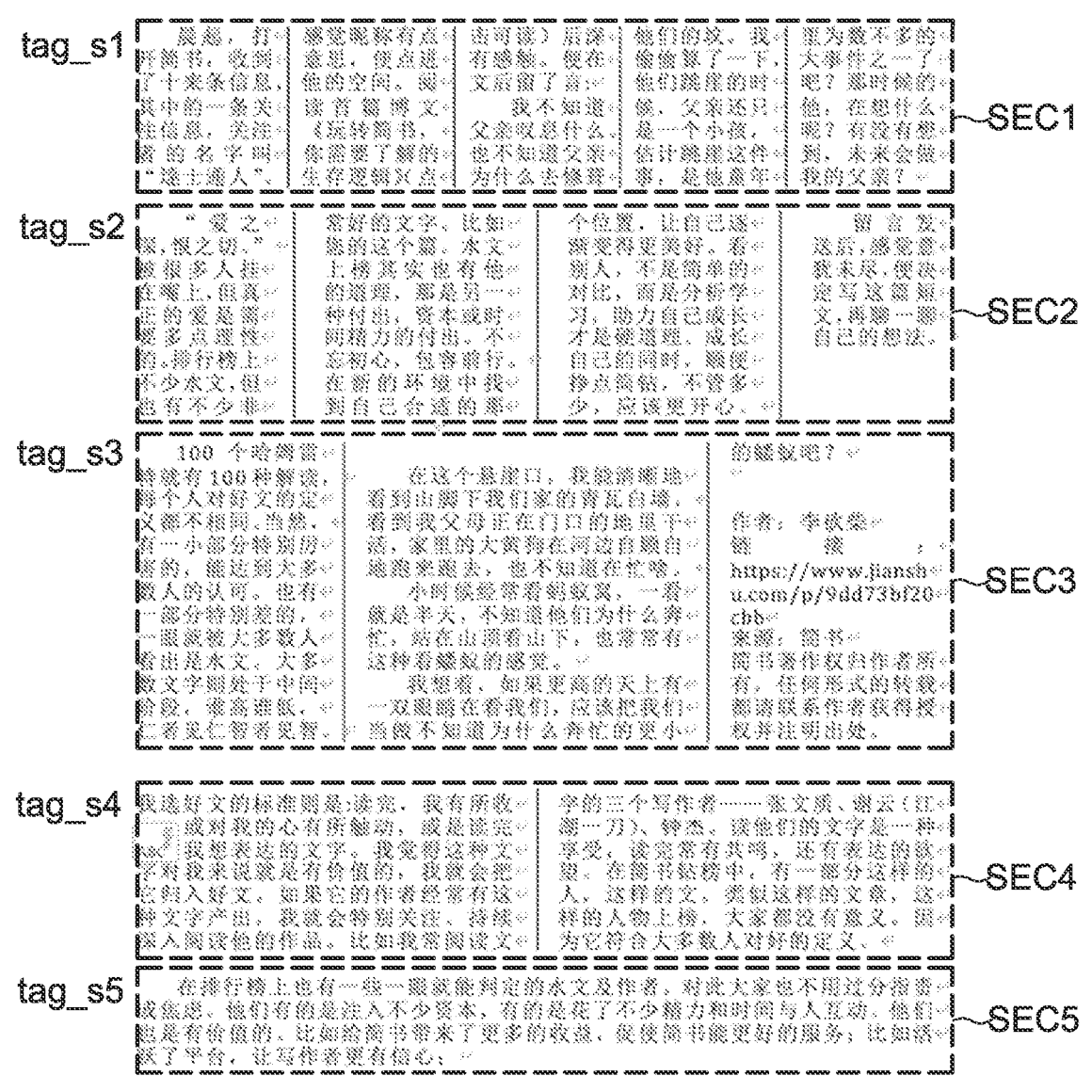
Figure 3B:
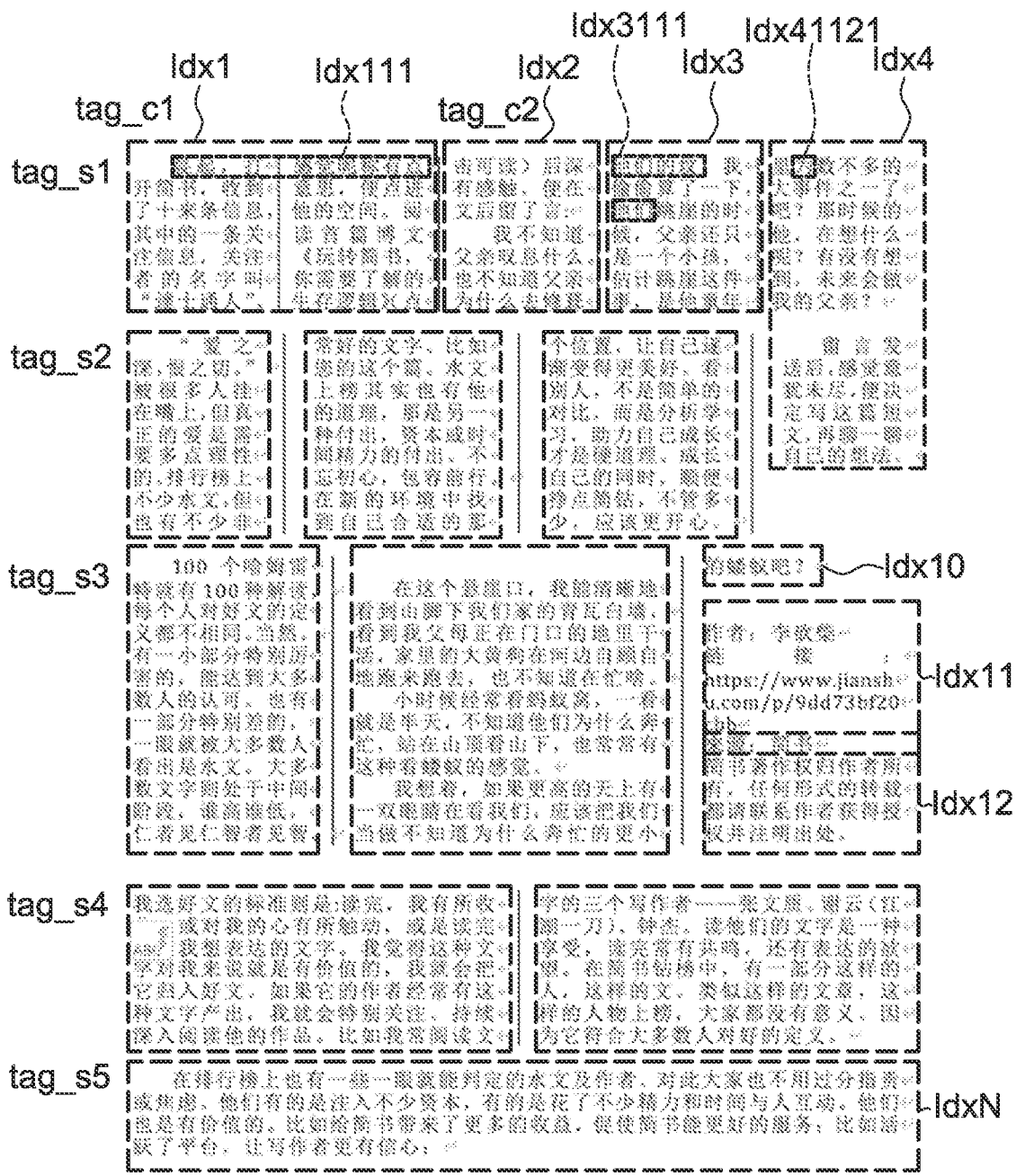

Step S2023: Next, the computer program 122 determines whether to run the column breaking at first or run the section breaking at first. Among the kept gap outliers, if longitudinal gap outliers are larger than transverse gap outliers, the section breaking are performed at first. For example, FIG. 3A shows that the PDF text is divided into five sections SEC1 to SEC5 from top to bottom, and a section tag is given to each section, e.g., shown as tag_s1 to tag_s5. On the contrary, if the longitudinal gap outliers are smaller than the transverse gap outliers, the column breaking are performed at first and a column tag is given to each column, e.g., shown as tag_c1, tag_c2 . . . in FIG. 3B. Meanwhile, one section tag and one column tag may determine one block tag, e.g., Idx1=(tag_s1, tag_c1), Idx2=(tag_s2, tag_c2), and so on. The section tags, the column tags and the block tags are added to the information of characters.

In one aspect, the computer program 122 determines whether the section breaking is run first or the column breaking is run first by comparing the maximum transverse gap×a transverse parameter with the maximum longitudinal gap×a longitudinal parameter. The transverse parameter is obtained by calculating, for example, an average font size/the maximum font size. If the font size is larger, the transverse parameter is smaller. The longitudinal parameter is obtained by calculating, for example, a total number of lines/an error factor. The total number of lines is obtained by calculating (the maximum Y coordinate-the minimum Y coordinate)/an average font size. If there is no error adjustment, the error factor is set as 1.

It should be mentioned that although FIGS. 3A and 3B show that the section breaking is performed at first and then the column breaking is performed, they are only intended to illustrate but not to limit the present disclosure.

The initial division of Step S202 runs recursively and is not stopped until the gap outliers become zero (e.g., gaps substantially identical), i.e. the computer program 122 identifying no section breaking and no column breaking further required.

Figure 4:
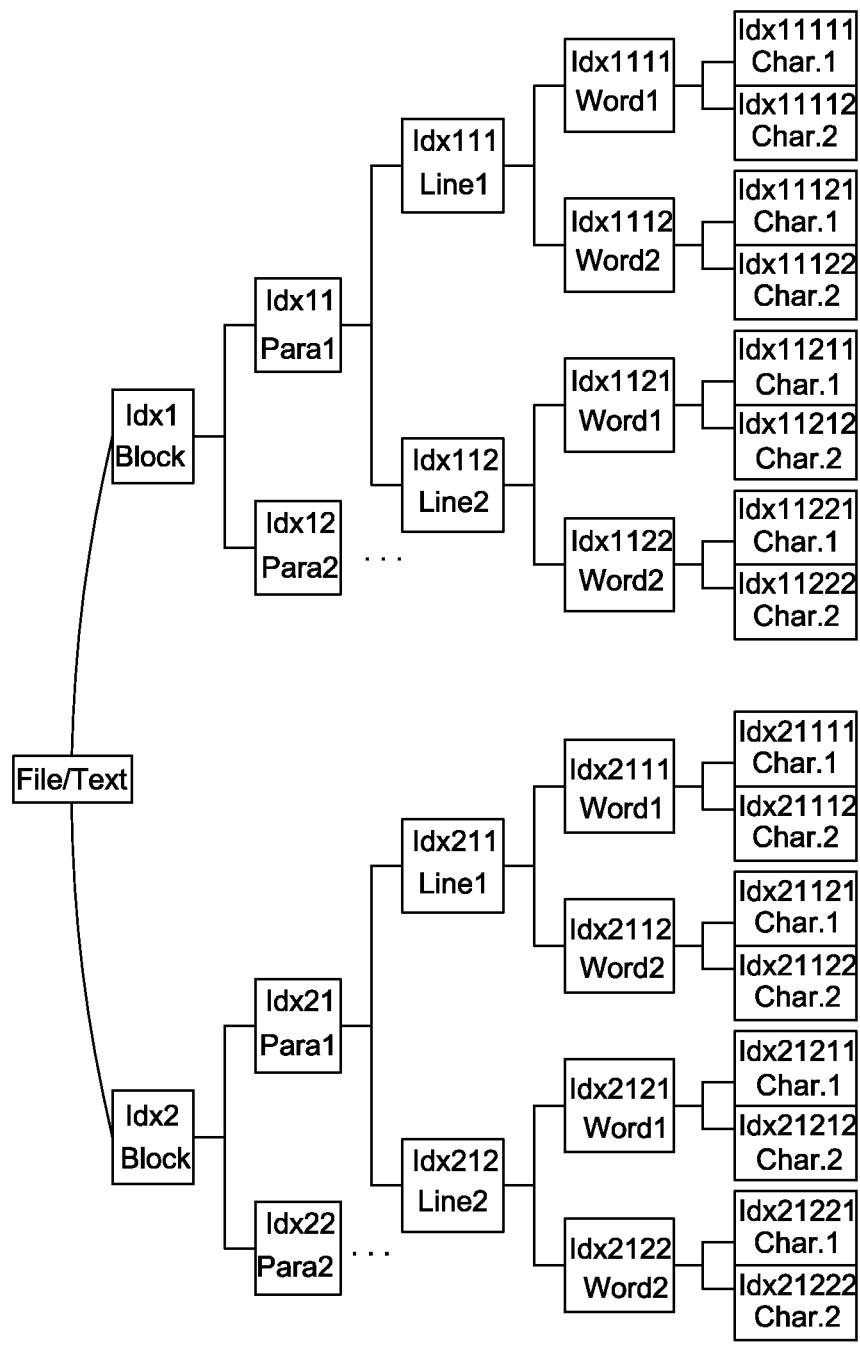
FIG. 4 is a schematic diagram of a data structure of the Steps S203 and S211 in FIG. 2.

Step S203: Now, a data structure of multiple initial text blocks of the PDF text is determined, e.g., the tree data structure shown in FIG. 4. For example, each block tag (or referred to text block tag) includes block indexes, paragraph indexes, line indexes, word indexes and character indexes, and the block tags are added to the information of characters in the memory 13. Please refer to FIG. 3B again, the text block indexes are shown as, for example, Idx1, Idx2, Idx3, Idx4 . . . IdxN; a line index is shown as, for example, Idx111 indicating the first line of the first paragraph of the text block Idx1, and the paragraph index is indicated by "1" since there is only one paragraph; a word index is shown as, for example, Idx3111 indicating the first word of the first line of the first paragraph of the text block Idx3; a character index is shown as, for example, Idx41121 indicating the first character of the second word of the first line of the first paragraph of the text block Idx4. In this aspect, it is assumed that the foreign characters "里" and "为 数不多" are respectively one word. Therefore, each character of the PDF text is added with the information of block tags, as shown in FIG. 4.

Next, the computer program 122 further sequentially calibrates the characters, lines and words in each block (or referred to text block, e.g., Idx1, Idx2, Idx3 . . . shown in FIG. 3B) not fulfilling the rules to improve the segmentation accuracy.

Step S204: Firstly, the computer program 122 processes error characters, e.g., removing garbled, repeated and blank characters, and stores the default character indexes (obtained from PDF bank) into the memory 13 to be used in the following steps.

Step S205: Next, the computer program 122 processes lines not fulfilling rules, i.e. inaccurate lines herein. For example, the computer program 122 splits one line into two lines when identifying baselines of characters in said one line are not on the same line, or character indexes in said one line are not continuous, but not limited to. In one aspect, the following steps are executed: (i) collecting data having identical line indexes (e.g., referring to FIG. 4); (ii) gathering data composed of blank character string; (iii) removing the blank character string gathered in the step (i) and (ii); and (iv) optimizing the line data collected in the step (i) to improve the accuracy so as to split lines mistakenly merged in one line and to merge lines mistakenly split as different lines, e.g., including the following comparisons to optimize the result of the step (i): comparing baselines of characters, comparing line gaps, comparing character lengths, comparing character spaces, identifying pure numbers or pure blank character string, identifying subscript deviation, identifying index string, identifying continuous character indexes.

Step S206: After the splitting of lines, the character indexes may become discontinuous. Therefore, the computer program 122 needs to update the recordation of character indexes in the memory 13 to cause the character indexes to become continuous again.

Figure 8:
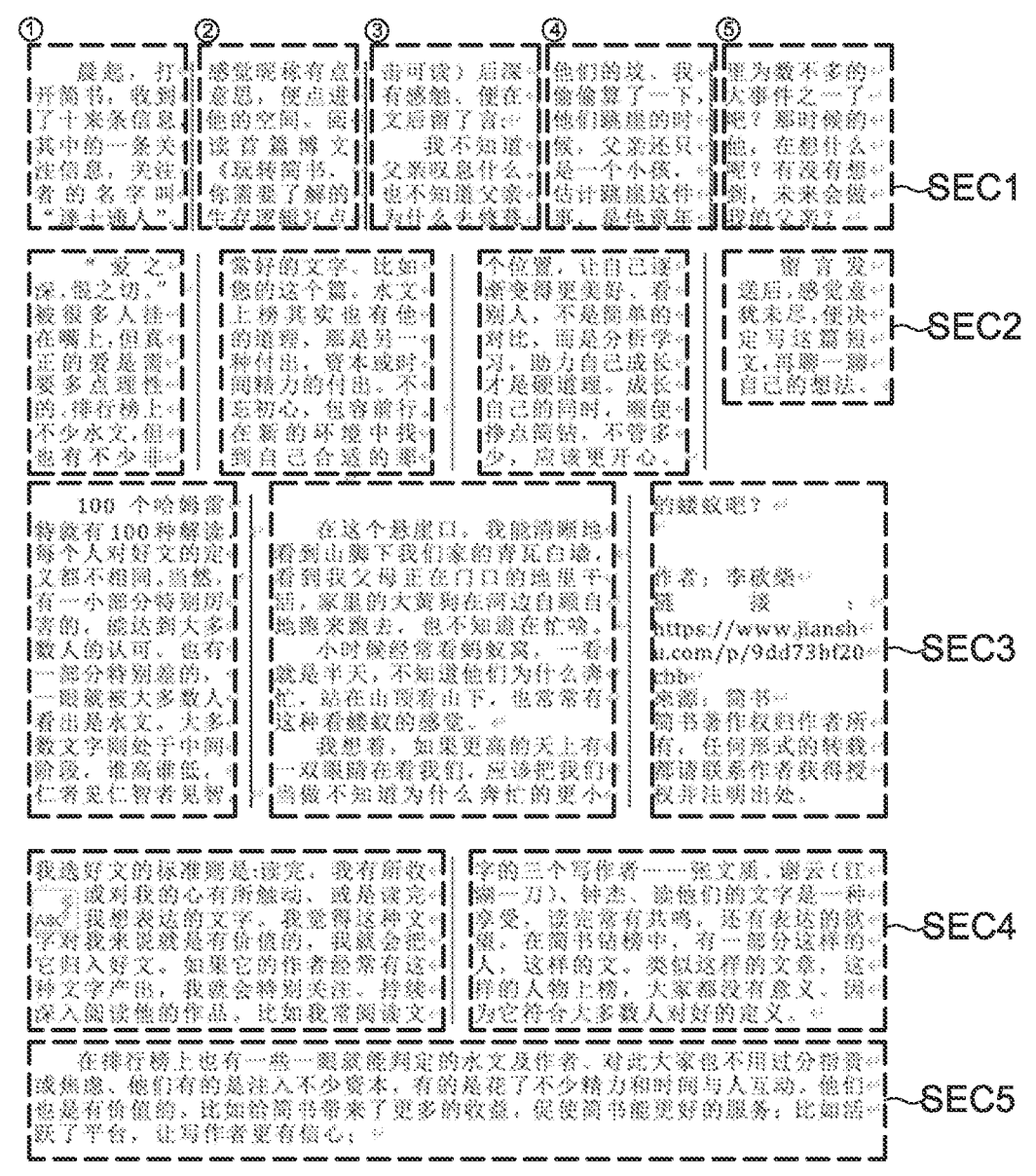

In addition, in the case that the text block Idx1 in FIG. 3B is divided into two text blocks, e.g., referring to the text block ① and text block ② in FIG. 8, the character sequence read from the PDF back is the first sequence shown in FIG. 5. It is seen that the PDF bank sequentially arranges the character sequence of two different text block ① and text block ②. Therefore, to split a text block according to the present disclosure, the lines need to be re-arranged as the second sequence shown in FIG. 5, and a column tag is given on the foreign character " "戚"," ", e.g., shown as Tag_b so as to indicate that a column is broken at the position. Next, the computer program 122 further re-arranges the character sequence as the third sequence shown in FIG. 5.

Step S207: According to the column tags indicated in the Step S206, the lines behind the first line are processed using the same way as shown in FIG. 5 such that the information of characters of the text block Idx1 in FIG. 3B is split into two text blocks and given new character indexes.

Step S208: Next, the computer program 122 processes words not fulfilling rules, i.e. inaccurate words herein. For example, when words are overlapped identified according to the character lengths and the character spaces, the overlapped words are split. For example, when the baselines of adjacent words are not on the same line (but within a predetermined distance), the longitudinal positions of said adjacent words are adjusted to be at the same baseline. In one aspect, the following steps are executed: collecting data having identical line indexes (e.g., referring to FIG. 4); (ii) optimizing the line data collected in the step (i) to improve the accuracy so as to split lines mistakenly merged in one line and to merge lines mistakenly split as different lines, including the following comparisons to optimize the result of the step (i): comparing baselines of characters, comparing line gaps, comparing character lengths, comparing character spaces, identifying pure numbers or pure blank character string, identifying subscript deviation, identifying index string, identifying continuous character indexes; and (iii) re-arranging the line indexes in the step (i).

Operating to this moment, the computer program 122 has finished the initial division in the memory 13, and error calibrations of the characters, lines and words in the segmented first text blocks are sequentially accomplished so as to improve the accuracy of determining text blocks.

Figures 6A, 6B, 7:
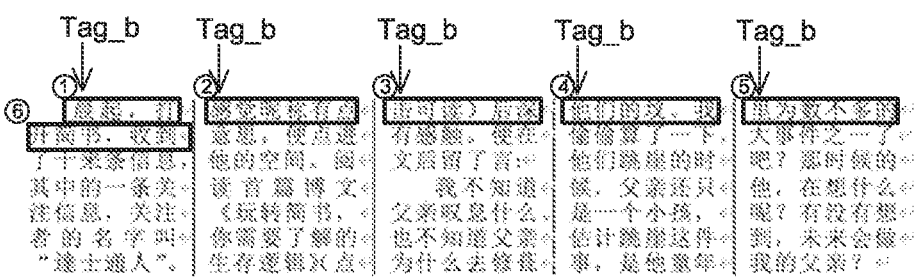
FIGS. 6A and 6B are schematic diagrams before and after the baseline sorting of the Step S209 in FIG. 2.
FIG. 7 is a schematic diagram of the Step S210 in FIG. 2.

Step S209: Before transforming to the format of a target document (e.g., taking a Word file as an example, but not limited to), a baseline arrangement is performed on all lines. For example, FIG. 6A shows line tags prior to the baseline arrangement, e.g., shown from ① to ⑬ which sequentially increase in the longitudinal direction; and FIG. 6B shows line tags after the baseline arrangement, e.g., shown from ① to ⑩ which sequentially increase in the transverse direction.

Step S210: Please refer to FIG. 7, the computer program 122 then sequentially compares the overlapping between two lines (e.g., shown as character sets within rectangular blocks) in the transverse direction and the longitudinal direction according to the line tags after the baseline arrangement, i.e. according to FIG. 6B. For example, the computer program 122 sequentially compares line 1 and line 2, line 2 and line 3, line 3 and line 4, and so on. In FIG. 7, line 5 and line 6 are overlapped in the transverse direction but are not overlapped in the longitudinal direction, and thus the computer program 122 merges line 1 and line 6 as one text block (e.g., referred to a second text block for distinguishing from the above first text block), and so on. When the comparing process is performed to the first section break (e.g., tag_s1 shown in FIG. 3A) end, text block ① to text block ⑤ are obtained as shown in FIG. 8. The computer program 122 gives every text block a column tag, e.g., shown as Tag_b, and also gives line tags to every line in the text block to be recorded in the memory 13.

Step S211: Then, the words associated with every second text block are stored in the memory 13 using the data structure fulfilling the format of a target document (e.g., Word file). The data structure is, for example, a four-dimensional set including paragraph data, line data, word data and character data as shown in FIG. 4.

Step S212: The computer program 122 then sequentially compares two text blocks (i.e. second text blocks) in the four-dimensional set to identify whether a secondary merging or a secondary division should be performed or not. Please refer to FIG. 3B again, for example when the text blocks Idx11 and Idx12 are overlapped to each other, the computer program 122 merges the text blocks Idx11 and Idx12 to one text block, referred to the secondary merging herein. For example, the computer program 122 compares adjacent text blocks (e.g., the text blocks at left side) adjacent to the text blocks Idx10, Idx11 and Idx12. When all the text blocks at the left side are single-text block, the computer program 122 merges the text blocks Idx10, Idx11 and Idx12 as single-text block too, referring to the secondary merging herein. On the contrary, when identifying that adjacent text blocks adjacent to a single-text block are two separated text blocks, the computer program 122 splits the single-text block to two different text blocks, referring to the secondary division herein. After this step, the segmentation shown in FIG. 8 is obtained.

Step S213: Now, the PDF text has been transformed to a final text that is recognizable by a target document. The computer program 122 then performs the final arrangement and line division on the final text to be outputted as a target document.

It should be mentioned that although the above embodiment is described in an example by dividing one text page of a PDF text, the present disclosure is not limited thereto. In other aspects, when the method for determining text blocks of the present disclosure is run, the computer program 122 performs the block segmentation processing continuously on all pages of a PDF file.

In the present disclosure, the target document is, for example, Office Software including Word, Outlook, PowerPoint, but not limited to.

The format and the writing of a target document are known to the art, i.e. using the conventional method to generate the target document, and thus details thereof are not described herein. The main objective of the present disclosure is to provide a method for determining text blocks in a PDF text.

The present disclosure further provides a computer equipment including a storage device and a processor 11. The storage device is used to record a computer program 122 therein. The processor 11 is used to run the computer program 122 in the storage device to perform the method for determining text blocks of a PDF file as shown in FIG. 2.

The present disclosure further provides a content accessible memory 12 which is recorded with a computer program 122 therein. The computer program 122 is run by the processor 11 to implement the method for determining text blocks of a PDF file as shown in FIG. 2.

It should be mentioned that the segmentation mentioned in the present disclosure are only intended to illustrate but not to limit the present disclosure. The actual segmentation is determined according to actual PDF texts.

As mentioned above, because original information of a PDF file generally does not contain information of section breaks and column breaks, the prior art cannot transform the section breaks and column breaks in the PDF file directly to Office Software or other table-form document formats. Accordingly, the present disclosure further provides a method for recognizing text blocks of a PDF text and transforming the recognized PDF text to other document formats (e.g., referring to FIG. 2), and a device, a computer equipment and a storage medium (e.g., referring to FIG. 1) using the method. Accordingly, when a user is intended to transform a PDF file into other target documents, the section breaks and column breaks are transformed accurately so as to avoid errors occurred in the file transformation.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A method for determining text blocks of a portable document format (PDF) text, comprising:
　acquiring information of characters of the PDF text;
　performing an initial division according to gap outliers of the PDF text in a transverse direction and a longitudinal direction, and adding block tags of first text blocks to the information of characters, wherein the initial division is repeatedly performed till the gap outliers becoming zero;
　sequentially processing inaccurate lines and inaccurate words in each first text block according to baselines of characters, character lengths, character spaces and character indexes;
　performing a baseline arrangement on lines of the PDF text;

sequentially comparing two lines after the baseline arrangement to form second text blocks; and sequentially comparing two second text blocks to identify whether to perform a secondary merging and a secondary division; and storing words associated with the second text blocks in the memory using a data structure matching a target document format.

2. The method as claimed in claim 1, wherein the information of characters comprise the baselines, heights, widths, ascenders, descenders, line gaps, leadings, fonts, coordinates, colors of words, and the block tags of the first text blocks comprise text block indexes, paragraph indexes, line indexes, word indexes, and character indexes.

3. The method as claimed in claim 1, wherein after the initial division further comprises:

processing error characters in each first text blocks and recording default character indexes.

4. The method as claimed in claim 1, wherein the secondary merging is to merge two second text blocks overlapped to each other, and the secondary division is performed when two adjacent second text blocks are separated from each other.

5. A device configured to determine text blocks of a PDF text, the device comprising:

a non-volatile storage medium, configured to record a computer program;

a memory, configured to provide an environment for operations of the computer program in the non-volatile storage medium; and a processor, configured to run the computer program to obtain information of characters of the PDF text to be stored in the memory, perform an initial division according to gap outliers of the PDF text in a transverse direction and a longitudinal direction, and to add block tags of first text blocks to the information of characters in the memory, wherein the initial division is repeatedly performed till the gap outliers becoming zero, sequentially process inaccurate lines and inaccurate words in each first text block according to baselines of characters, character lengths, character spaces and character indexes, and to update the character indexes of the information of characters in the memory, perform a baseline arrangement on lines of the PDF text, sequentially compare two lines after the baseline arrangement to form second text blocks, and sequentially compare two second text blocks to identify whether to perform a secondary merging and a secondary division, and store words associated with the second text blocks in the memory using a data structure matching a target document format.

6. The device as claimed in claim 5, wherein the secondary merging is to merge two second text blocks overlapped to each other, and the secondary division is performed when two adjacent second text blocks are separated from each other.

7. A computer equipment, comprising:

a storage device, configured to record a computer program; and a processor, configured to run the computer program recorded in the storage device to perform the method as claimed in claim 1.

8. The computer equipment as claimed in claim 7, wherein in the method, the information of characters comprise the baselines, heights, widths, ascenders, descenders, line gaps, leadings, fonts, coordinates, colors of words, and the block tags of the first text blocks comprise text block indexes, paragraph indexes, line indexes, word indexes, and character indexes.

9. The computer equipment as claimed in claim 7, wherein the method after the initial division further comprises:

processing error characters in each first text blocks and recording default character indexes.

10. The computer equipment as claimed in claim 7, wherein in the method, the initial division is repeatedly performed till the gap outliers becoming zero.

11. The computer equipment as claimed in claim 7, wherein in the method, the secondary merging is to merge two second text blocks overlapped to each other, and the secondary division is performed when two adjacent second text blocks are separated from each other.

12. A content accessible memory, the content accessible memory being recorded with a computer program, wherein the computer program is run by a processor to perform the method as claimed in claim 1.

13. The content accessible memory as claimed in claim 12, wherein in the method, the information of characters comprise the baselines, heights, widths, ascenders, descenders, line gaps, leadings, fonts, coordinates, colors of words, and the block tags of the first text blocks comprise text block indexes, paragraph indexes, line indexes, word indexes, and character indexes.

14. The content accessible memory as claimed in claim 12, wherein the method after the initial division further comprises:

processing error characters in each first text blocks and recording default character indexes.

15. The content accessible memory as claimed in claim 12, wherein in the method, the initial division is repeatedly performed till the gap outliers becoming zero.

16. The content accessible memory as claimed in claim 12, wherein in the method, the secondary merging is to merge two second text blocks overlapped to each other, and the secondary division is performed when two adjacent second text blocks are separated from each other.

* * * * *